US012434385B2

(12) United States Patent
Zhu et al.

(10) Patent No.: US 12,434,385 B2
(45) Date of Patent: Oct. 7, 2025

(54) MULTI-THREAD CONTROLLER FOR PARALLEL ROBOT

(71) Applicant: Chenxing (Tianjin) Automation Equipment Co., Ltd., Tianjin (CN)

(72) Inventors: Pingbu Zhu, Tianjin (CN); Yanhua Li, Tianjin (CN); Hui Wang, Tianjin (CN); Zhifeng Li, Tianjin (CN); Songtao Liu, Tianjin (CN)

(73) Assignee: Chenxing (Tianjin) Automation Equipment Co., Ltd., Tianjin (CN)

( * ) Notice: Subject to any disclaimer, the term of this patent is extended or adjusted under 35 U.S.C. 154(b) by 0 days.

(21) Appl. No.: 18/012,961

(22) PCT Filed: Apr. 12, 2022

(86) PCT No.: PCT/CN2022/086273
§ 371 (c)(1),
(2) Date: Dec. 26, 2022

(87) PCT Pub. No.: WO2023/115758
PCT Pub. Date: Jun. 29, 2023

(65) Prior Publication Data
US 2024/0100697 A1    Mar. 28, 2024

(30) Foreign Application Priority Data
Dec. 23, 2021    (CN) .......................... 202111584313.2

(51) Int. Cl.
*G06F 3/00*    (2006.01)
*B25J 9/16*    (2006.01)

(52) U.S. Cl.
CPC ... *B25J 9/1664* (2013.01); *G05B 2219/34333* (2013.01); *G05B 2219/39001* (2013.01)

(58) Field of Classification Search
CPC ........................................................ G06F 9/48
See application file for complete search history.

(56) References Cited

U.S. PATENT DOCUMENTS 6,457,097 B1 *    9/2002    Tamura .................... G06F 3/064
                                                        711/113
6,823,518 B1 *    11/2004    Bliss ....................... G06F 9/451
                                                        717/125

(Continued)

OTHER PUBLICATIONS

M. A. Diftler, Experiments in Aligning Threaded Parts Using a robot Hand. (Year: 1998).*

*Primary Examiner* — Lechi Truong
(74) *Attorney, Agent, or Firm* — Bay State IP, LLC

(57) ABSTRACT

The present disclosure relates to a multi-thread controller for a parallel robot. All tasks are concentrated in four layered threads, namely, a main thread, a real-time thread, a preprocessing thread and a background thread; different priorities of tasks are placed in different levels of threads, so that motion logic is first ensured, second motion planning, then communication and interface interaction, and finally file reading and time consumption calculation; various operations are strictly performed in respective threads; and between the threads are provided a thread security queue for data interaction and a thread clock calling and task pushing mechanism, so that the security of communication calling and the flexibility of data interaction are realized between the threads.

5 Claims, 6 Drawing Sheets

(56) References Cited

U.S. PATENT DOCUMENTS

| | | | | |
|---|---|---|---|---|
| 7,289,964 | B1* | 10/2007 | Bowman-Amuah | G06F 9/5038 |
| | | | | 705/1.1 |
| 9,875,192 | B1* | 1/2018 | Allen | G06F 9/45558 |
| 2003/0038842 | A1* | 2/2003 | Peck | G06F 11/263 |
| | | | | 715/763 |
| 2015/0339002 | A1* | 11/2015 | Arnold | G06F 3/0481 |
| | | | | 715/854 |
| 2017/0368689 | A1* | 12/2017 | Tomida | B25J 9/0084 |
| 2019/0187703 | A1* | 6/2019 | Millard | G05D 1/249 |
| 2021/0146531 | A1* | 5/2021 | Tremblay | G06N 3/006 |
| 2022/0134537 | A1* | 5/2022 | Chadalavada Vijay Kumar | B25J 9/163 |
| | | | | 700/250 |
| 2022/0155992 | A1* | 5/2022 | Nortman | G06F 9/544 |
| 2022/0277472 | A1* | 9/2022 | Birchfield | G06N 3/08 |
| 2025/0060723 | A1* | 2/2025 | Zhu | G06F 9/48 |

\* cited by examiner

MULTI-THREAD CONTROLLER FOR PARALLEL ROBOT

CROSS REFERENCE TO RELATED APPLICATION

This application is for entry into the U.S. National Phase from which priority is claimed under all applicable sections of Title 35 of the United States Code including, but not limited to, Sections 120, 363, and 365(c) to International Application No. PCT/CN2022/086273 filed on Apr. 12, 2022, and which in turn claims priority under 35 USC 119 to Chinese Patent Application No. 202111584313.2 filed on Dec. 23, 2021.

TECHNICAL FIELD

The present disclosure relates to the technical field of robots, more particular to a multi-thread controller for a parallel robot.

BACKGROUND

Robot motion control is a relatively complex process. The control of the robot requires high timeliness. It is needed to ensure the timeliness of the communication between the controller and hardware. At the same time, the process of robot motion planning needs some time-consuming operations such as reading and writing of files, communications and mathematic calculation, which operations not only require necessary data for movement, but also mustn't affect the timeliness of the communication with hardware, so it is necessary to distinguish threads.

However, for multi-threaded programs, the cooperation and interaction between threads has always been a difficult point for the program. For example, the existing solutions are not flexible enough for data exchange and task push processing between multi-threads, resulting in insufficient timeliness and security of the overall control process.

SUMMARY

The present disclosure provides a multi-thread controller for a parallel robot to solve the problems of insufficient timeliness and security of the existing multi-thread control scheme.

The above aim of the present disclosure is realized through the following technical scheme.

The embodiments of the present disclosure provide a multi-thread controller for a parallel robot, including a main thread, a real-time thread, a preprocessing thread and a background thread, wherein the main thread, the real-time thread, the preprocessing thread and the background thread are scheduled by each other, which are configured to ensure the normal calling and execution of the threads by creating a thread task and storing data to a buffer list to be called by other threads and by the way of a thread security queue;

the main thread is configured to perform initialization and thread calling to realize the control of motion logic of the parallel robot, wherein the initialization includes initializing hardware communication, initializing a log management tool, initializing an alarm management tool, initializing a user-defined TCP communication protocol, initializing a clock and initializing a robot parameter; the thread calling includes receiving a variable modification instruction, receiving an execution instruction, performing an asynchronous operation and controlling communication;

the real-time thread is configured to perform communication and interface interaction with hardware equipment, including acquiring a robot hardware parameter, calculating a robot moving platform real-time position, sending a control signal to hardware and triggering I/O equipment in real time;

the preprocessing thread is configured to perform motion planning, including variable instruction parsing, robot motion planning and latest instruction planning; and the background thread is configured to perform file reading and writing and time consumption calculation.

Optional, tasks in each thread are stored in a memory in the form of a task list, each generated task includes one specific clock signal, the tasks are arranged in chronological order of the clock, and each thread calls the tasks in the task list according to the chronological order of the clock.

Optional, when performing variable modification, the calling logic of execution of each thread includes:

the main thread creates a background cache thread and adds a task corresponding to the variable modification instruction to a background task list, creates a preprocessing thread and sends a data packet corresponding to the variable modification instruction to the preprocessing thread;

after receiving the data packet sent by the main thread, the preprocessing thread performs instruction parsing, and creates a real-time thread task for acquiring a robot's end position;

the real-time thread reads the robot hardware parameter according to the task created by the preprocessing thread, calculates a real-time platform position parameter, and creates a preprocessing thread to perform a next position update planning; and the background thread performs necessary file reading.

Optional, when performing dragging teaching, the calling logic of execution of each thread includes:

the real-time thread, on one hand, acquires the robot hardware parameter, calculates a real-time platform position parameter, and creates a preprocessing thread to perform path processing on track points, and, on the other hand, reads a robot's end torque sensor parameter, converts the torque parameter into a control signal, and sends the control signal to a driver;

the preprocessing thread, on one hand, acquires a robot position list sent by the real-time thread, performs path planning and instruction parsing, serializes the position parameter into a visual program format, and creates a main thread task and updates in real time an HMI interface instruction, and, on the other hand, acquires the robot real-time position sent by the real-time thread, and creates a real-time thread to update the HMI simulation display;

the main thread, on one hand, acquires a data packet of the visual program format sent by the preprocessing thread and sends display update information to the HMI, and, on the other hand, creates a background thread so that it stores program running log information to a file; and the background thread performs necessary file reading.

Optional, when performing robot running control, the calling logic of execution of each thread includes:

the preprocessing thread, on one hand, acquires a robot running program list, performs serialization parsing to obtain a data packet of a visual text format and sends the data packet to the main thread task, and, on the other hand, acquires the robot real-time position sent by the real-time thread, calculates a parameter of a next position of the robot, and creates a real-time thread task to perform this operation;

the real-time thread, on one hand, reads the robot hardware parameter, calculates a real-time moving platform position parameter, and creates a preprocessing thread to perform a next position update planning, and, on the other hand, acquires the position parameter updated by the preprocessing thread, converts the position parameter into a control signal, and sends the control signal to the driver;

the main thread, on one hand, acquires the data packet of the visual text format sent by the preprocessing thread, and sends display update information to the HMI, and, on the other hand, creates a background thread to store program running log information to a file; and the background thread performs necessary file reading.

The technical scheme provided by the embodiments of the present disclosure may include the following beneficial effects.

According to the technical scheme provided by the embodiments of the present disclosure, all tasks are concentrated in four layered threads, namely, a main thread, a real-time thread, a preprocessing thread and a background thread; different priorities of tasks are placed in different levels of threads, so that motion logic is first ensured, second motion planning, then communication and interface interaction, and finally file reading and time consumption calculation; various operations are strictly performed in respective threads; and between the threads are provided a thread security queue for data interaction and a thread clock calling and task pushing mechanism, so that the security of communication calling and the flexibility of data interaction are realized between the threads.

It should be understood that the above general description and the hereinafter detailed description are merely exemplary and explanatory and hence cannot be constructed as limitation on the present disclosure.

BRIEF DESCRIPTION OF THE DRAWINGS

Accompanying drawings that are incorporated into the description and constituting one part of the description show the embodiments conforming to the present disclosure and are used for illustrating the principle of the present disclosure together with the description.

DETAILED DESCRIPTION OF THE EMBODIMENTS

Exemplary embodiments are illustrated below in detail, examples of which are shown in accompanying drawings. When the following description involves the drawings, unless otherwise stated, the same designators in different accompanying drawings are used for representing the same or similar elements. The implementations described in the following exemplary embodiments do not represent all the implementations conforming to the present disclosure. They are just examples of devices and methods conforming to some aspects of the present disclosure as detailed in the claims appended herein.

The thread management mode of existing controllers has defects as shown in Table 1.

TABLE 1

| Thread management mode | Defects |
| --- | --- |
| Threads not distinguished | If threads are not distinguished, the timeliness of the system will decrease, impacting the timeliness of motion. |
| Threads not assigned | If the threads are disordered and there are too many threads, the enabling and disabling of the threads will frequently consume resources. |
| Assigned but not consolidated | If multi-thread in the programing language is just simply used after the threads are assigned, flexible data exchange and task pushing cannot be realized between multiple threads. |
| Other existing platforms | With other existing robot control platforms, generally the security and timeliness can be ensured through other methods, however, the threads cannot be distinguished flexibly as the user expects, but to some extent rely on the user's own consideration. |

In order to solve the above problems, the present disclosure provides an allocation and consolidation scheme for multi-thread control. Detailed description is provided below through embodiments.

Embodiments

Figure 1:
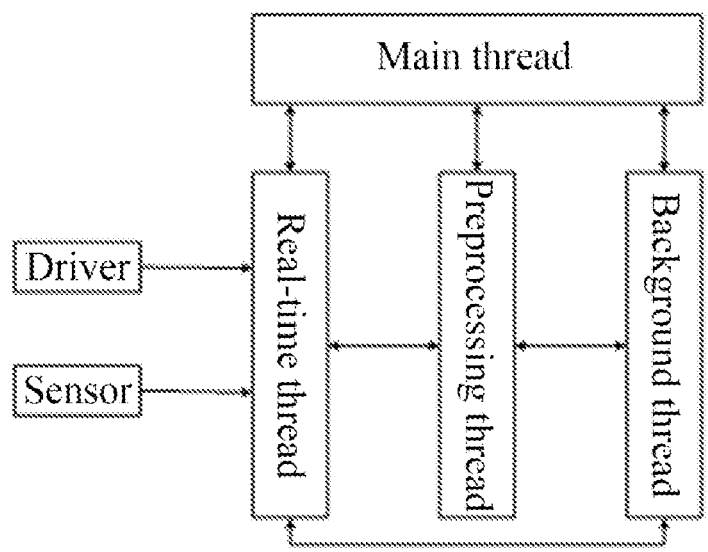
FIG. 1 is a structure diagram of a multi-thread controller for a parallel robot according to the embodiments of the present disclosure.

Referring to FIG. 1, which is a structure diagram of a multi-thread controller for a parallel robot according to the embodiments of the present disclosure, the multi-thread controller includes a main thread, a real-time thread, a preprocessing thread and a background thread, wherein the real-time thread performs real-time communication with a driver (for example, an electric motor) and a sensor. The real-time thread needs to reduce complicated calculations as much as possible, to ensure that the periodic calculation of each real-time thread does not run overtime. In order to reduce the load of the real-time thread, heavy-calculation tasks are transferred to the preprocessing thread, which then sends the calculation result to the real-time thread. Each thread has a definite division of task types, and specific tasks are as shown in Table 2.

The main task of each thread is described below in detail in conjunction with Table 2.

TABLE 2

|  | Main Thread | Real-Time Thread | Preprocessing Thread | Background Thread |
|---|---|---|---|---|
| Initializations | Initializing hardware communication<br>Log management<br>Alarm module management<br>TCP communication<br>Initializing clock<br>Robot parameter configuration<br>Initializing other threads | | | |
| Tasks | Variable modification instruction<br>Receiving execution<br>Asynchronous operation | Acquiring robot hardware parameter<br>Calculating robot moving platform real-time position<br>Sending control signal to hardware | Variable instruction parsing<br>Robot motion planning | File reading and writing<br>Time consumption calculation |
| Clock | Initializing clock pool object | Triggering I/O in real time | Planning latest instruction | |
| Cycle | HMI communication<br>TCP communication | | | |

1. Main Thread

The execution process of the main thread is mainly divided into two parts: performing initialization and thread calling to realize the control of motion logic of the parallel robot.

Here, the initialization is completed when the program process is being started, including initialization of tools such as communication, log and clock and reading of robot hardware parameters, specifically including:
1. initializing hardware communication, in which the initialization is based on the real-time industrial fieldbus communication protocol EtherCAT of the development architecture of Ethernet, so that a less jitter and more accurate clock is acquired with the characteristics of distributed clock to accomplish data exchange based on hardware equipment;
2. initializing a log management tool, so that this tool can be used to record all behaviors executed by each thread when the thread is called and express the behaviors in accordance with certain standards and store them in a file in the form of text;
3. initializing an alarm management tool, so that this tool can check the possible exceptions occurring in the running process of the program during an interaction with a user, to reduce program crashes and improve program stability;
4. initializing a user-defined TCP communication protocol, through which communications are accomplished between threads and between an HMI (Human Machine Interface) and the motion control system;
5. initializing a clock, to ensure that each thread is completed within a period in which the thread is executed cyclically, through a counting manner of time interval not impacted as system time changes; and
6. initializing a robot parameter, which needs to be configured first to facilitate subsequent calculation when the program process is being started, since the motion control system is a universal control system for parallel robots, which can accomplish adaption according to robot's actual parameters.

Figure 2:
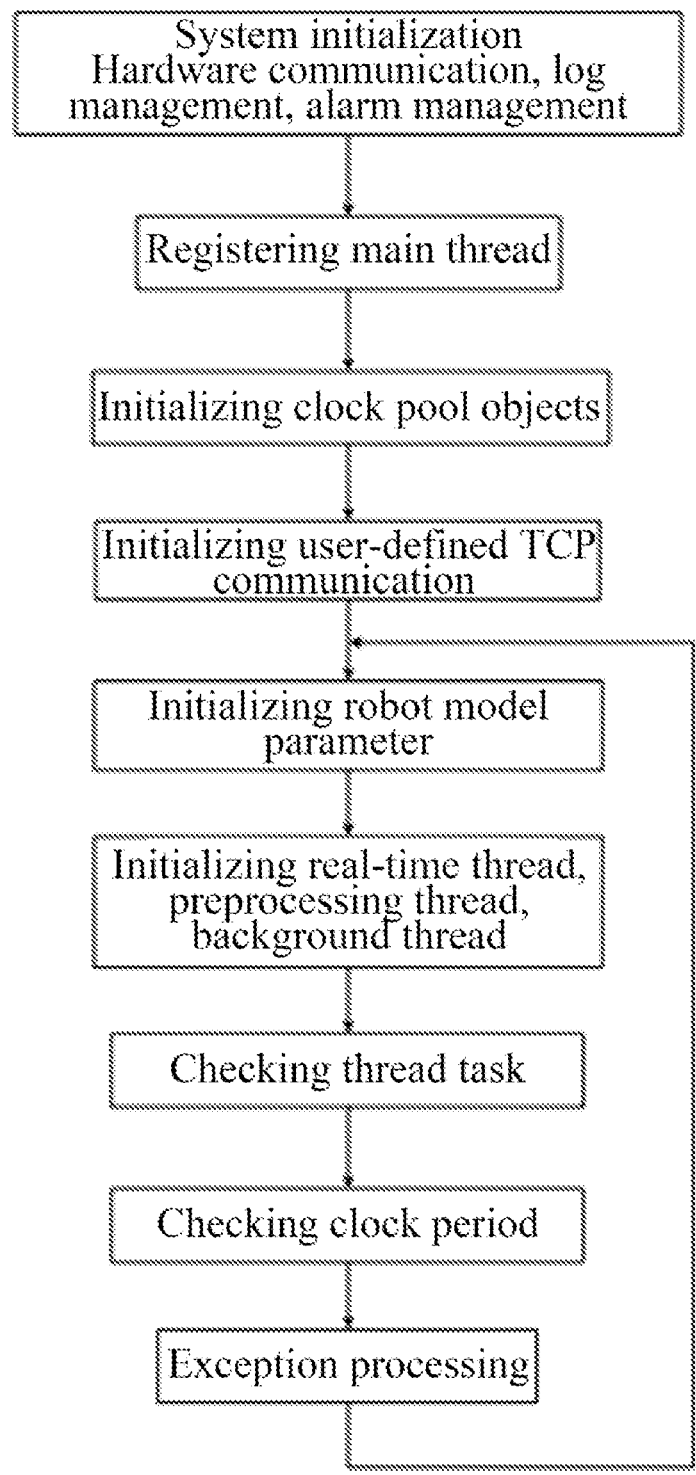
FIG. 2 is a diagram of an initialization flow of a main thread.

Since all sub-threads are created and run in the main thread, it is needed to initialize the hardware communication protocol, log management, alarms and the like of the system in the main thread; after the main thread is registered, it is needed to initialize the system clock pool objects to ensure that the clock is normally responding when each thread is running. Then, the TCP communication protocol is initialized to ensure the communications between the motion control system and the HMI and between the motion control system and the equipment. Each time the main thread task is responded, it is needed to initialize the robot parameters, ensuring the security and stability of the motion of the robot. Specific processes are as shown in FIG. 2.

In addition, the thread calling is to create a sub-thread and take charge of the calling of the sub-thread. After each sub-thread accomplishes a single instance related object, the control right is returned to the main thread; the sub-thread feeds back running statuses periodically and receives the interruption scheduling from the main thread. The thread calling specifically includes:
1. receiving a variable modification instruction, that is, when the HMI is modifying the variable, the HMI communication in the main thread listens cyclically, receives an HMI data packet, awakens a background process to perform a cache operation, updates in real time the HMI interface, creates a preprocessing thread task and sends the data packet to the preprocessing thread;
2. receiving an execution instruction, that is, receiving a data packet of HMI executed instruction, and sending it to the preprocessing thread and displaying in real time the instruction execution state;
3. performing an asynchronous operation, that is, while the program is being executed, performing alarming, HMI interface update and other asynchronous operations, namely, executing a program when performing communication between threads; and
4. controlling communication, that is, controlling the periodic execution of the HMI communication and TCP control communication, to ensure the timeliness and stability of the system.

1. Real-Time Thread

The real-time thread needs to ensure strict timeliness, so that the motion of the manipulator is more stable. The real-time thread is the top-priority thread, which needs to strictly ensure the time of each entry and write the calculation result of the previous period into hardware (that is, send to the driver, for example, an electric motor) at the start of each cycle, and read the feedback data of the sensor and the like into the control system, that is, realizing communication and interface interaction with the hardware equipment, specifically including the following:
1. acquiring a robot hardware parameter, that is, reading in real time the hardware parameters of the robot, such as joint angle and position, creating a preprocessing thread, and sending the data packet to the preprocessing thread;
2. calculating a robot moving platform real-time position, that is, calculating the robot's end (moving platform) position according to the robot hardware parameter, alternatively, calculating the robot hardware posture parameter according to the intended position of the instruction, and sending a control signal to the hardware; or, sending a data packet to the preprocessing thread according to the real-time posture parameter to generate an instruction;
3. sending a control signal to hardware, that is, converting the received preprocessing thread instruction into a specific motor (driver) control signal; and
4. triggering I/O equipment in real time, that is, sending an I/O response signal to the motion control system in real time. For those tasks of greater than 100 microseconds, the user need to be extremely careful and should think of placing them into the preprocessing thread or other threads to process.

3. Preprocessing Thread

The preprocessing thread is configured to perform parsing of the HMI variable instruction and perform instruction planning of the robot running program, that is, realizing motion planning, specifically including:
1. variable instruction parsing, that is, receiving the HMI variable instruction modification data packet sent by the main thread, deserializing it into an executable program through a parser and creating a real-time thread to execute it;
2. robot motion planning, that is, acquiring the real-thread posture parameter, performing path planning and serializing the instruction into a visual instruction variable, and sending it to the main thread in the form of a data packet; and
3. latest instruction planning, that is, planning the chronological order of the instruction.

The motion planning in the preprocessing thread is a very complicated process, including path planning, speed planning, working space, coordinate system conversion, etc. This embodiment only introduces the logic part of instruction calling. Specific implementation details are not described here.

4. Background Thread

The background thread executes the operations needing to wait, mainly executing reading and writing of files, time consumption calculation and system operation tasks; the background thread is of a lowest priority, preventing interfering with other threads, and ensuring the calculations with high timeliness to take precedence; specifically including:
1. file reading and writing, that is, the main thread creates a background access process when receiving the HMI variable instruction modification, which may be interrupted by other threads at any time during the execution process; and
2. time consumption calculation, that is, those programs needing heavy calculation are put in the background for calculation, to improve the controller timeliness and avoid affecting the system performance.

In addition, during practical applications, the main thread, the real-time thread, the preprocessing thread and the background thread are scheduled by each other, which are configured to ensure the normal calling and execution of the threads by creating a thread task and storing data to a buffer list to be called by other threads and by the way of a thread security queue. The thread security queue is a queue at the program level, where data can be written from one thread only, ensuring that no exceptional data and error data will be read when the data is read from other threads. When in practice, the program needs to add the prepared data structure body to the end of a queue and pop up the earliest structure from the queue for usage. The program provides call of data exchange between all threads by encapsulating these two interfaces. Here, the data manages the memory in the form of a smart pointer, avoiding waste of system resources. Through the thread security queue, one thread can add the needed data to the queue and safely hand it to another thread to perform subsequent processing.

Figure 3:
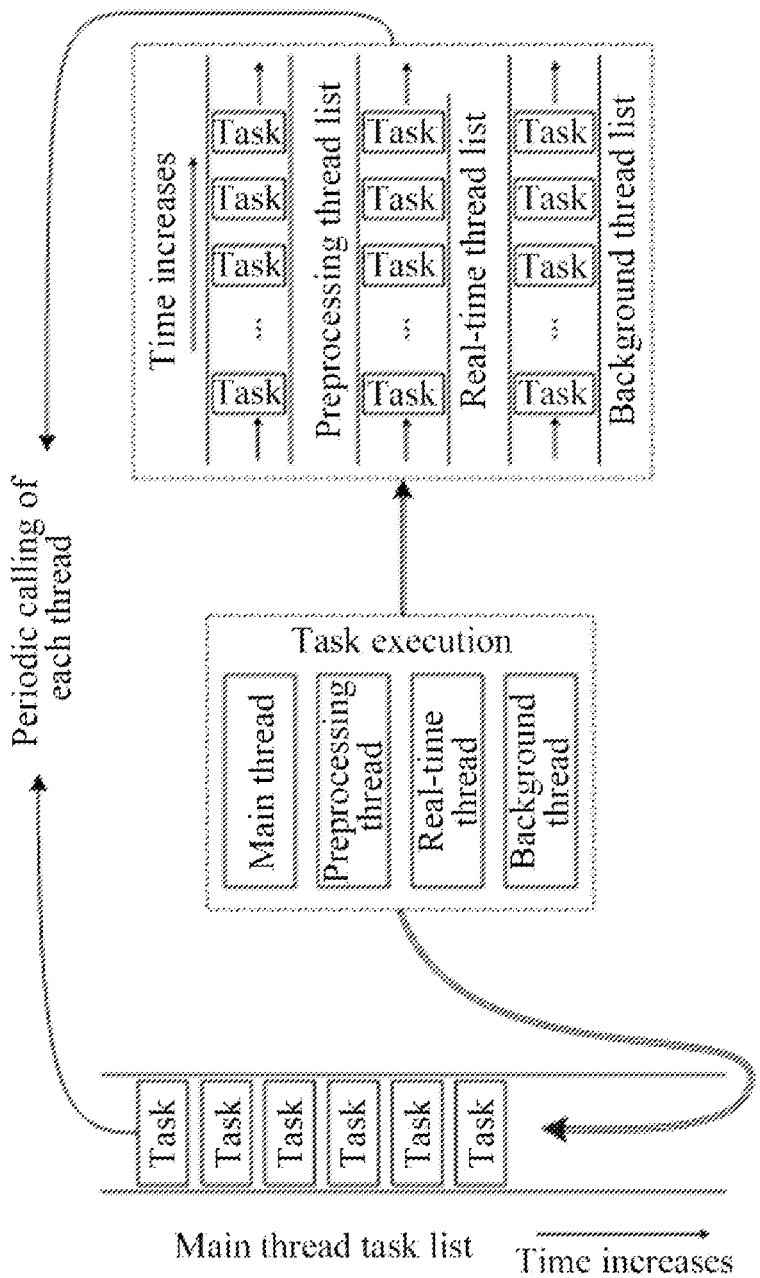
FIG. 3 is a diagram of a task list pushing process of each of the threads.

Under the premise that the clock is accurate, the thread security queue mechanism is required to ensure the stable execution of programs. Tasks in each thread are stored in a memory in the form of a task list, each generated task includes one specific clock signal and the tasks are arranged in chronological order of the clock, therefore, the push to each task list also supports insertion besides FIFO rules. Each thread calls the tasks in the task list according to the chronological order of the clock. The thread calls system resources during the execution period, and releases the system resources when completing execution or the period ends, avoiding the system resources being idle, specifically as shown in FIG. 3.

In addition, as described in the above embodiments, each thread has a definite division of task types, however, during practical applications, each thread does not need to execute once all the commands that can be executed, just needing a definite execution step and returning the execution command of a next thread. For example, one real-time thread may just calculate the robot moving platform real-time position and send it to a preprocessing thread, which then continues to respond to the execution of this command; another real-time thread may acquire the robot hardware parameter and send it to a preprocessing thread for calculations such as robot motion planning. For a better understanding, the calling logic of execution of the above threads are described through several examples below.

Figure 4:
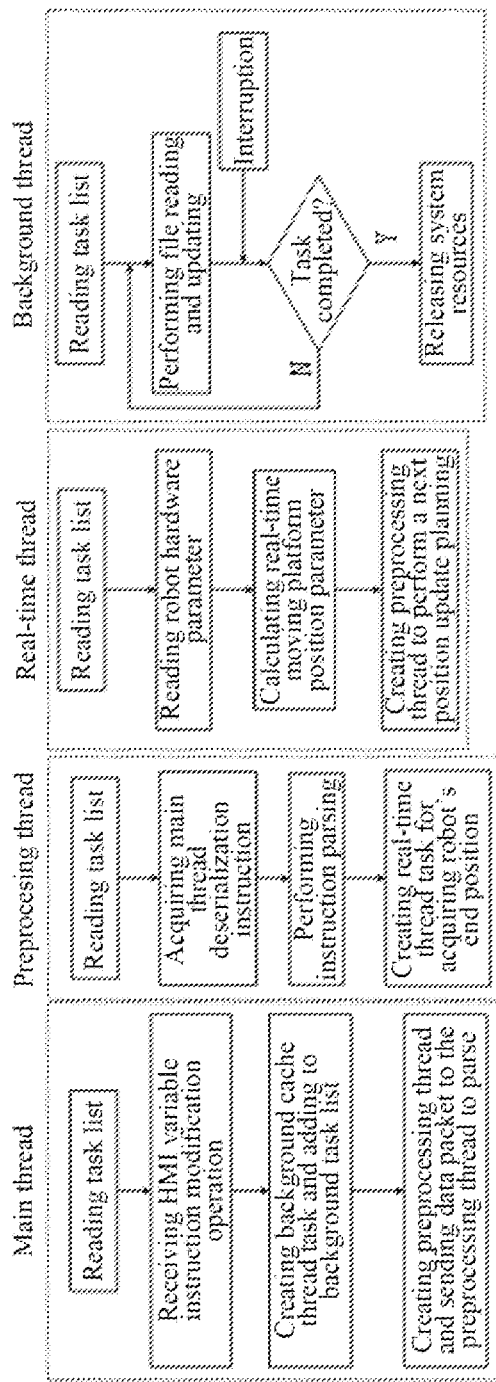
FIG. 4 is a diagram of a calling logic of each of the threads after acquiring a variable modification instruction transmitted by HMI.

(1) Variable modification, that is, a user transmits a variable modification instruction through the HMI to modify the variable. The main calling logic of each thread is as shown in FIG. 4, mainly including:
the main thread creates a background cache thread and adds a task corresponding to the variable modification instruction to a background task list, creates a preprocessing thread and sends a data packet corresponding to the variable modification instruction to the preprocessing thread;
after receiving the data packet sent by the main thread, the preprocessing thread performs instruction parsing, and creates a real-time thread task for acquiring a robot's end position;
the real-time thread reads the robot hardware parameter according to the task created by the preprocessing thread, calculates a real-time platform position parameter, and creates a preprocessing thread to perform a next position update planning; and
the background thread performs necessary file reading.

Figure 5:
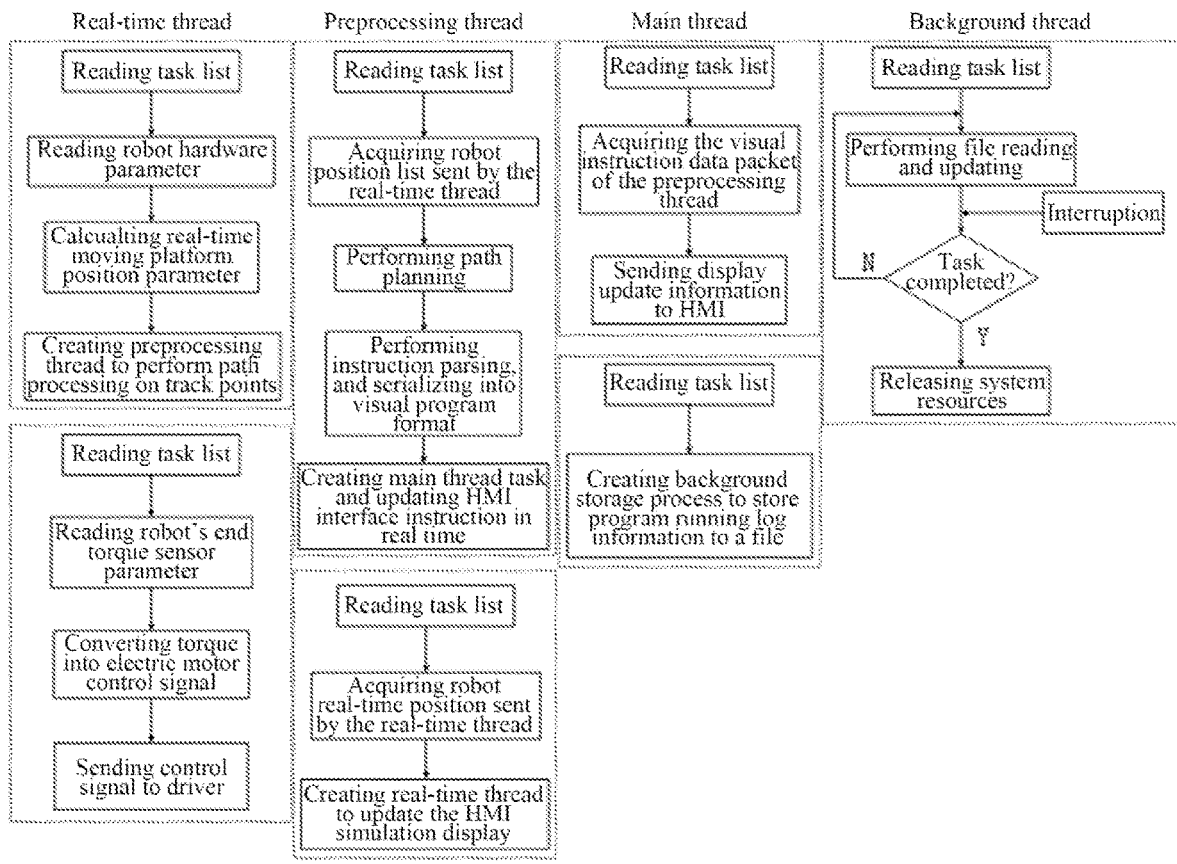
FIG. 5 is a diagram of a calling logic of each of the threads in the case of dragging teaching.

(2) Dragging teaching, that is, the operator directly drags each joint of the robot to an ideal posture, and the process is recorded by the robot. The main calling logic of each thread is as shown in FIG. 5, mainly including:

the real-time thread, on one hand, acquires the robot hardware parameter, calculates a real-time platform position parameter, and creates a preprocessing thread to perform path processing on track points, and, on the other hand, reads a robot's end torque sensor parameter, converts the torque parameter into a control signal, and sends the control signal to a driver;

the preprocessing thread, on one hand, acquires a robot position list sent by the real-time thread, performs path planning and instruction parsing, serializes the position parameter into a visual program format, and creates a main thread task and updates in real time an HMI interface instruction, and, on the other hand, acquires the robot real-time position sent by the real-time thread, and creates a real-time thread to update the HMI simulation display;

the main thread, on one hand, acquires a data packet of the visual program format sent by the preprocessing thread and sends display update information to the HMI, and, on the other hand, creates a background thread so that it stores program running log information to a file; and the background thread performs necessary file reading.

Figure 6:
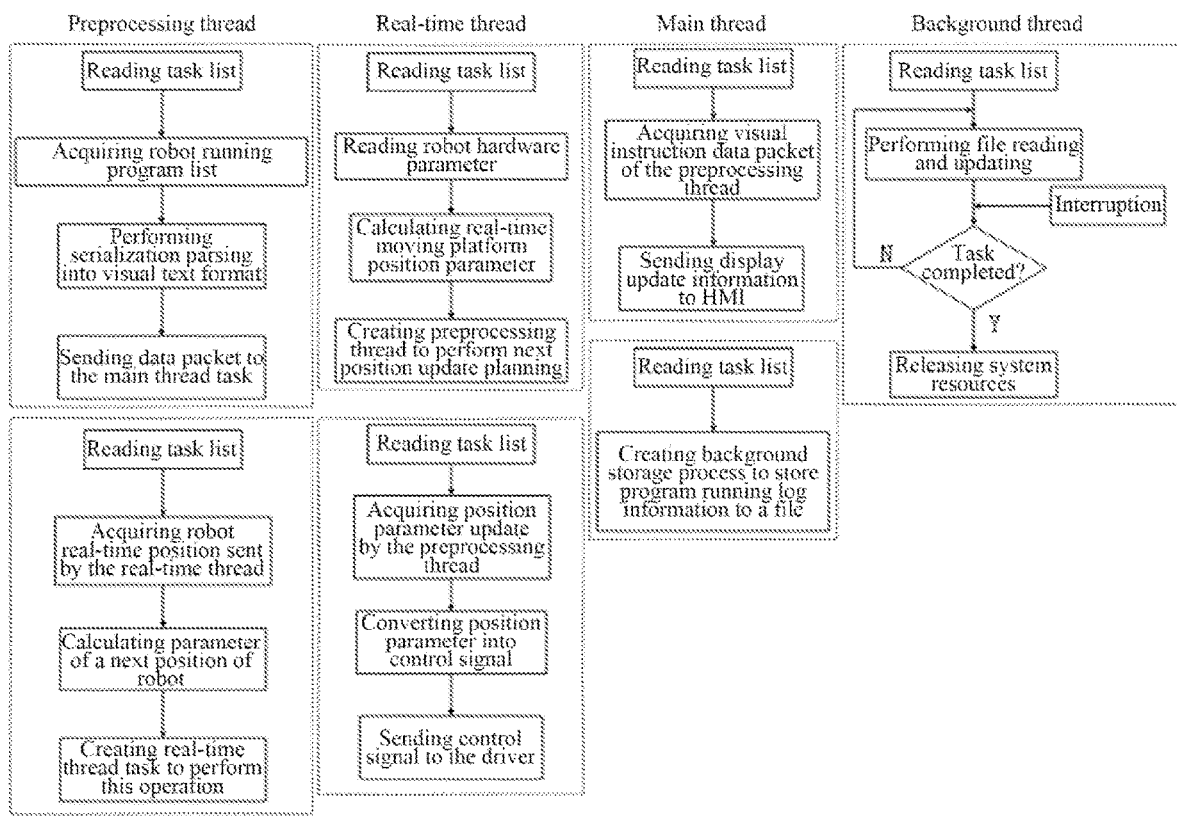
FIG. 6 is a diagram of a calling logic of each of the threads in the case of running control.

(3) Running control, that is, the controller controls the robot to run according to instructions. The main calling logic of each thread is as shown in FIG. 6, mainly including:

the preprocessing thread, on one hand, acquires a robot running program list, performs serialization parsing to obtain a data packet of a visual text format and sends the data packet to the main thread task, and, on the other hand, acquires the robot real-time position sent by the real-time thread, calculates a parameter of a next position of the robot, and creates a real-time thread task to perform this operation;

the real-time thread, on one hand, reads the robot hardware parameter, calculates a real-time moving platform position parameter, and creates a preprocessing thread to perform a next position update planning, and, on the other hand, acquires the position parameter updated by the preprocessing thread, converts the position parameter into a control signal, and sends the control signal to the driver;

the main thread, on one hand, acquires the data packet of the visual text format sent by the preprocessing thread, and sends display update information to the HMI, and, on the other hand, creates a background thread to store program running log information to a file; and the background thread performs necessary file reading.

Based on the above embodiments, in the scheme of the present disclosure, all tasks are concentrated in four layered threads, namely, a main thread, a real-time thread, a preprocessing thread and a background thread; different priorities of tasks are placed in different levels of threads, so that motion logic is first ensured, second motion planning, then communication and interface interaction, and finally file reading and time consumption calculation; various operations are strictly performed in respective threads; and between the threads are provided a thread security queue for data interaction and a thread clock calling and task pushing mechanism, so that the security of communication calling and the flexibility of data interaction are realized between the threads.

It is understandable that the same or similar parts in each above embodiment can refer to each other; those contents not described in detail in some embodiments can refer to the same or similar contents in other embodiments.

It should be noted that, in the description of the present disclosure, terms such as "first", "second", etc. are merely for the purpose of description, but cannot be understood as the indication or implication of relative importance. In addition, in the description of the present disclosure, unless otherwise stated, "a plurality of" and "many" means at least two.

Flowcharts or any process described herein in other manners or method descriptions may be understood as representing a module, a fragment or a part of the codes including one or more executable instructions used for implementing steps of a particular logic function or process; further, the scope of the preferred embodiments of the present disclosure includes additional implementations which may not be in the indicated or discussed order, including executing the functions in a substantially simultaneous manner or in reverse order, depending on the functions involved, and this shall be understood by those skilled in the field to which the embodiments of the present disclosure belongs.

It should be understood that each part of the present disclosure may be implemented through hardware, software, firmware or combinations thereof. In the above embodiments, multiple steps or methods may be implemented through software or firmware stored in a memory and executed by proper instruction or systems. For example, if implemented through hardware, like in another embodiment, they may be implemented through any one of the following known technologies in the art or a combination thereof: discrete logic circuits with logic gate circuits for realizing logic function on data signal, special integrated circuits with appropriate combined logic gate circuits, Programmable Gate Array (PGA), Field Programmable Gate Array (FPGA), etc.

The ordinary staff in this field can understand that all or part steps carried in the above method embodiments may be implemented through a program instructing related hardware, the program may be stored in a computer readable storage medium, and when being executed, includes one of the steps in the method embodiment or a combination thereof.

In addition, each function unit in each embodiment of the present disclosure may be integrated in one processing module, or each unit may exist physically and separately, or two or more units are integrated in one module. The above integrated modules may be realized in the form of hardware, or in the form of a software function module. The integrated module may also be stored in a computer-readable storage medium if implemented in the form of a software function module and sold or used as an independent product.

The above mentioned storage medium may be a read-only memory, a disk or a compact disc, etc.

In the description of the specification, terms such as "one embodiment", "some embodiment", "example", "specific example", or "some examples" mean that the specific features, structures, materials, or features described in combination with the embodiment or example are included in at least one embodiment or example of the present disclosure. In the specification, indicative expressions of the above terms do not necessarily refer to the same embodiments or examples. Moreover, the specific features, structures, materials or features described may be combined in an appropriate manner in any one or more embodiments or examples.

Although the above has shown and described the embodiments of the present disclosure, it is understandable that the above embodiments are exemplary and cannot not be viewed as restrictions to the present disclosure. The ordinary skill in the art can perform modifications, changes, substitutions and transformations on the above embodiments within the scope of the present disclosure.

What is claimed is:

1. A multi-thread controller for a parallel robot, comprising a main thread, a real-time thread, a preprocessing thread and a background thread, wherein the main thread, the real-time thread, the preprocessing thread and the background thread are scheduled by each other, which are configured to ensure the normal calling and execution of the threads by creating a thread task and storing data to a buffer list to be called by other threads and by the way of a thread security queue;

the main thread is configured to perform initialization and thread calling to realize the control of motion logic of the parallel robot, wherein the initialization comprises initializing hardware communication, initializing a log management tool, initializing an alarm management tool, initializing a user-defined TCP communication protocol, initializing a clock and initializing a robot parameter; the thread calling comprises receiving a variable modification instruction, receiving an execution instruction, performing an asynchronous operation and controlling communication;

the real-time thread is configured to perform communication and interface interaction with hardware equipment, comprising acquiring a robot hardware parameter, calculating a robot moving platform real-time position, sending a control signal to hardware and triggering I/O equipment in real time;

the preprocessing thread is configured to perform motion planning, comprising variable instruction parsing, robot motion planning and latest instruction planning; and the background thread is configured to perform file reading and writing and time consumption calculation.

2. The multi-thread controller for the parallel robot according to claim 1, wherein tasks in each thread are stored in a memory in the form of a task list, each generated task comprises one specific clock signal, the tasks are arranged in chronological order of the clock, and each thread calls the tasks in the task list according to the chronological order of the clock.

3. The multi-thread controller for the parallel robot according to claim 2, wherein when performing variable modification, the calling logic of execution of each thread comprises:

the main thread creates a background cache thread and adds a task corresponding to the variable modification instruction to a background task list, creates a preprocessing thread and sends a data packet corresponding to the variable modification instruction to the preprocessing thread;

after receiving the data packet sent by the main thread, the preprocessing thread performs instruction parsing, and creates a real-time thread task for acquiring a robot's end position;

the real-time thread reads the robot hardware parameter according to the task created by the preprocessing thread, calculates a real-time platform position parameter, and creates a preprocessing thread to perform a next position update planning; and the background thread performs necessary file reading.

4. The multi-thread controller for the parallel robot according to claim 2, wherein when performing dragging teaching, the calling logic of execution of each thread comprises:

the real-time thread, on one hand, acquires the robot hardware parameter, calculates a real-time platform position parameter, and creates a preprocessing thread to perform path processing on track points, and, on the other hand, reads a robot's end torque sensor parameter, converts the torque parameter into a control signal, and sends the control signal to a driver;

the preprocessing thread, on one hand, acquires a robot position list sent by the real-time thread, performs path planning and instruction parsing, serializes the position parameter into a visual program format, and creates a main thread task and updates in real time an HMI interface instruction, and, on the other hand, acquires the robot real-time position sent by the real-time thread, and creates a real-time thread to update the HMI simulation display;

the main thread, on one hand, acquires a data packet of the visual program format sent by the preprocessing thread and sends display update information to the HMI, and, on the other hand, creates a background thread so that it stores program running log information to a file; and the background thread performs necessary file reading.

5. The multi-thread controller for the parallel robot according to claim 2, wherein when performing robot running control, the calling logic of execution of each thread comprises:

the preprocessing thread, on one hand, acquires a robot running program list, performs serialization parsing to obtain a data packet of a visual text format and sends the data packet to the main thread task, and, on the other hand, acquires the robot real-time position sent by the real-time thread, calculates a parameter of a next position of the robot, and creates a real-time thread task to perform this operation;

the real-time thread, on one hand, reads the robot hardware parameter, calculates a real-time moving platform position parameter, and creates a preprocessing thread to perform a next position update planning, and, on the other hand, acquires the position parameter updated by the preprocessing thread, converts the position parameter into a control signal, and sends the control signal to the driver;

the main thread, on one hand, acquires the data packet of the visual text format sent by the preprocessing thread, and sends display update information to the HMI, and, on the other hand, creates a background thread to store program running log information to a file; and the background thread performs necessary file reading.

* * * * *